United States Patent [19]

Chang

[11] Patent Number: 4,633,726

[45] Date of Patent: Jan. 6, 1987

[54] EXTERNAL HYDRAULIC DRIVING SYSTEM FOR MOTORCYCLE BRAKE, CLUTCH AND GEAR SHIFT

[76] Inventor: Kuo-Chou Chang, P.O. Box 10160, Taipei, Taiwan

[21] Appl. No.: 654,842

[22] Filed: Sep. 25, 1984

[51] Int. Cl.[4] .............................................. G05G 9/00
[52] U.S. Cl. .................................... 74/473 R; 74/488; 74/89.17; 74/89.21; 60/567; 60/571; 60/594; 180/336
[58] Field of Search ..................... 60/567, 571, 594; 180/336; 74/488, 489, 473 R, 89.17, 89.21

[56] References Cited

U.S. PATENT DOCUMENTS

| | | | |
|---|---|---|---|
| 2,615,305 | 10/1952 | Janssen | 60/567 |
| 2,788,676 | 4/1957 | Spexarth | 74/489 |
| 2,891,498 | 6/1959 | Schroeder | 60/571 |
| 3,475,911 | 11/1969 | Harrison | 60/594 |
| 3,991,845 | 11/1976 | La Pointe | 180/336 |
| 4,030,560 | 6/1977 | Parquet | 180/336 |
| 4,069,881 | 1/1978 | Shiber | 180/333 |
| 4,221,276 | 9/1980 | Mitchell | 180/336 |
| 4,497,503 | 2/1985 | Irwin | 74/488 |

Primary Examiner—Abraham Hershkovitz

[57] ABSTRACT

A hydraulic driving system for motorcycle gear shift includes a primary cylinder combination, a secondary cylinder and a set of delivery conduits for handling hydraulic fluid connected therebetween, in which two primary cylinders with different diameters are oppositely formed in a hollow portion of a motorcycle handle and the two primary cylinders are respectively fluidically communicated with the secondary cylinder to reciprocatively and linearly move a gear rack and to drive the shaft of the gear shift by rotating a twist bar, formed on the handle, having an inclined-plane tongue alternatively actuating the two primary cylinders in the handle.

2 Claims, 4 Drawing Figures

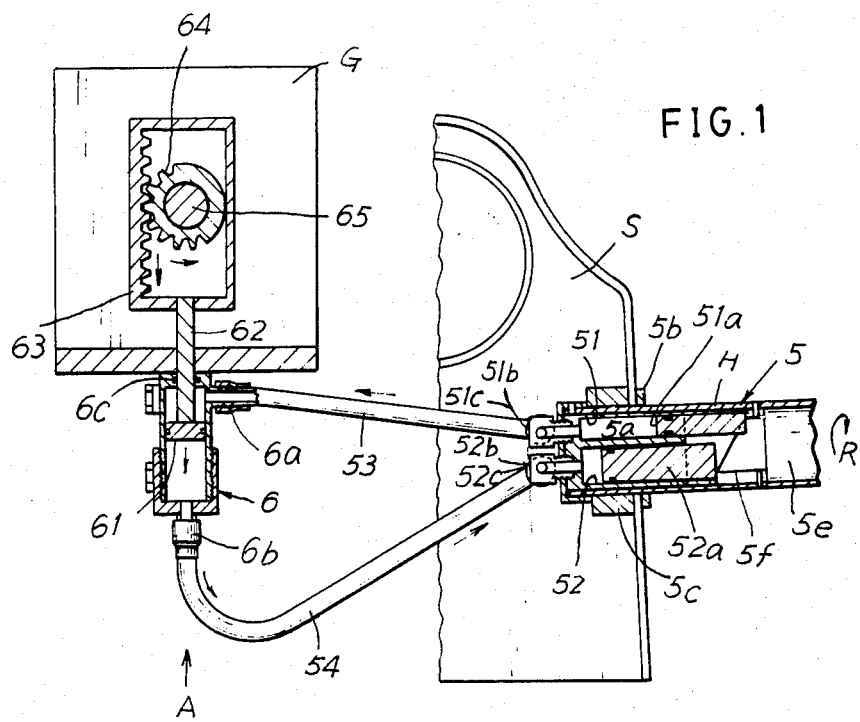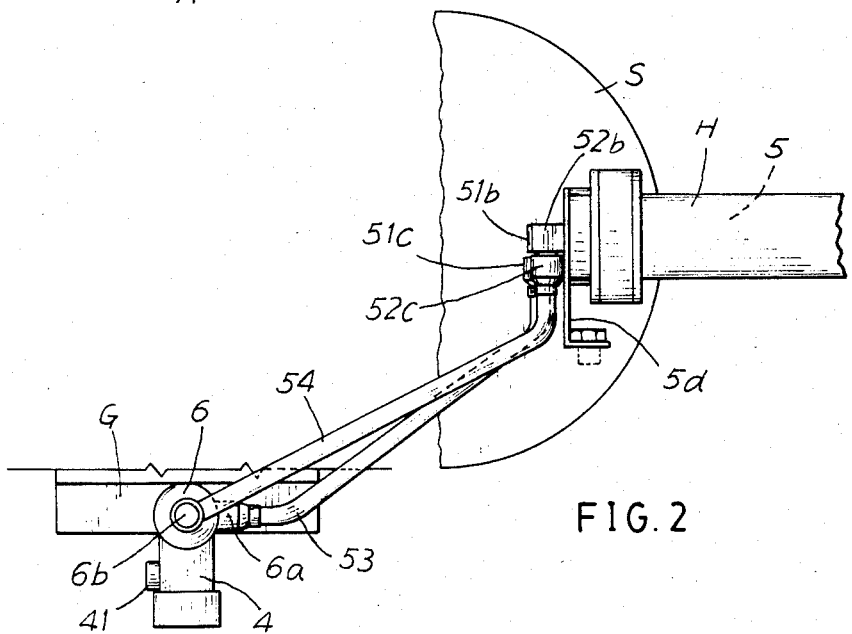

EXTERNAL HYDRAULIC DRIVING SYSTEM FOR MOTORCYCLE BRAKE, CLUTCH AND GEAR SHIFT

BACKGROUND OF THE INVENTION

Conventional motorcycles utilize a wire rope jacketed into a plastic hose to drive the brake, clutch or gear shift, which, however, will be easily broken after long time service to lose its original functions and may possibly cause traffic accidents. The wire ropes shuttled within the plastic hose during their operation may cause friction loss as the wire abrades by the hose especially in the bending hose portions to thereby require greater force for operating the brake, clutch or grear shift. Moreover, when pulling the wire ropes with a greater force, the wire may be broken to cause an accident.

The present inventor has found the defects of conventional means used in motorcycle brake, clutch or gear shift. An improvement over the conventional means has been made by the present inventor in view of the following specification accompanying the drawings.

BRIEF SUMMARY OF THE INVENTION

The object of the present invention is to provide a hydraulic driving system for motorcycle gear shift, which comprises a primary cylinder combination, a secondary cylinder and a set of delivery conduits for handling hydraulic fluid connected therebetween, and in which two primary cylinders with different diameters are oppositely formed in a hollow portion of a motorcycle handle and the two primary cylinders are respectively fluidically communicated with the secondary cylinder to reciprocatively and linearly move a gear rack and to drive the shaft of the gear shaft by rotating a twist bar formed in the handle having an inclined-plane tongue alternatively actuating the two primary cylinders therein.

Another object of the invention is to provide a hydraulic driving system for motorcycle gear shift, which comprises a primary cylinder combination having two primary cylinders mounted on a motorcycle handle; and a secondary cylinder composition having two secondary cylinders respectively and fluidically communicated with the two primary cylinders and operatively actuating the motorcycle gear shift.

BRIEF DESCRIPTION OF THE DRAWINGS

FIG. 1 is a sectional view of the present invention.

FIG. 2 is an illustration of the present invention taken from direction A of FIG. 1.

DETAILED DESCRIPTION

Figure 3:
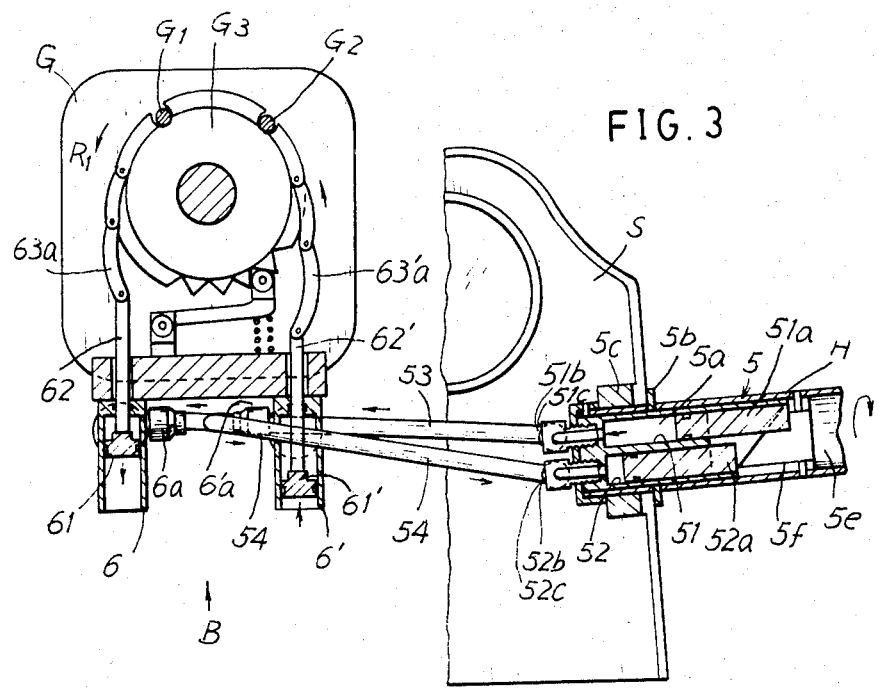
FIG. 3 is a sectional drawing of another preferred embodiment of the present invention.

As shown in FIG. 1 and FIG. 2, the present invention comprises a primary cylinder combination 5 and a secondary cylinder 6.

Primary cylinder combination 5 is formed as a cylindrical body inserted into a hollow portion of a handle H and is fixed onto a shield S by a fixing ring 5b, bushing 5c and fixing bracket 5d. In the cylindrical body of the primary cylinder combination 5, two primary cylinders 51, 52 with different diameters are provided. Primary cylinders 51 having a smaller diameter is provided with a piston 51a therein and filled with hydraulic fluid. An oil ring 51a is provided in the primary cylinder to prevent oil leakage. Cylinder 51 is then connected, by a connector 51b, a coupling 51c and a first delivery conduit 53, to an upper connector 6a positioned on the top portion of the secondary cylinder 6 as FIG. 1 shows. The secondary cylinder 6 is then connected, by a lower connector 6b formed on the lower portion of cylinder 6, to a second delivery conduit 54, another coupling 52c and another connector 52b, to primary cylinder 52 having a larger diameter. Naturally, another oil ring is provided to prevent oil leakage from the secondary cylinder. A twist bar 5e is rotatively provided within handle H. An inclined-plane tongue 5f is extended from bar 5e to alternatively push or retract two pistons 51a, 52a.

Secondary cylinder 6 comprises a piston 61 and a piston rod 62 which is connected with a gear rack 63 for engaging a driving gear 64 of a shaft 65 of the gear shift G. An oil ring 6c is provided thereon for preventing oil leakage.

The embodiment may be applied in gear shift of the type used in scooter 90 cc and 125 cc. As shown in FIG. 1, the twist bar 5e can be rotated in direction R and the inclined-plane tongue 5f is also rotated to push the pistion 51a of the cylinder having smaller diameter 51 to boost hydraulic fluid 5a through the first conduit 53 into the upper portion of secondary cylinder 6 so as to push downwards the piston 61 and rod 62 to drive the shaft 65 of the gear shift G. The fluid under piston 61 will be boosted though second conduit 54 to retract piston 52a of the cylinder having a larger diameter 52 for the next operation. As piston rod 62 occupies a substantial volume in the upper portion of secondary cylinder 6, the fluid volume above piston 61 and the fluid volume thereunder will be different. In order to keep an identical reciprocative stroke for two pistons 51a, 52a having different diameters, the ratio of cross-sectional areas of the two pistons must be designed to obtain a smooth operation of the whole system in that a maximum stroke of each piston 51a or 52a should be equivalent.

Figure 4:
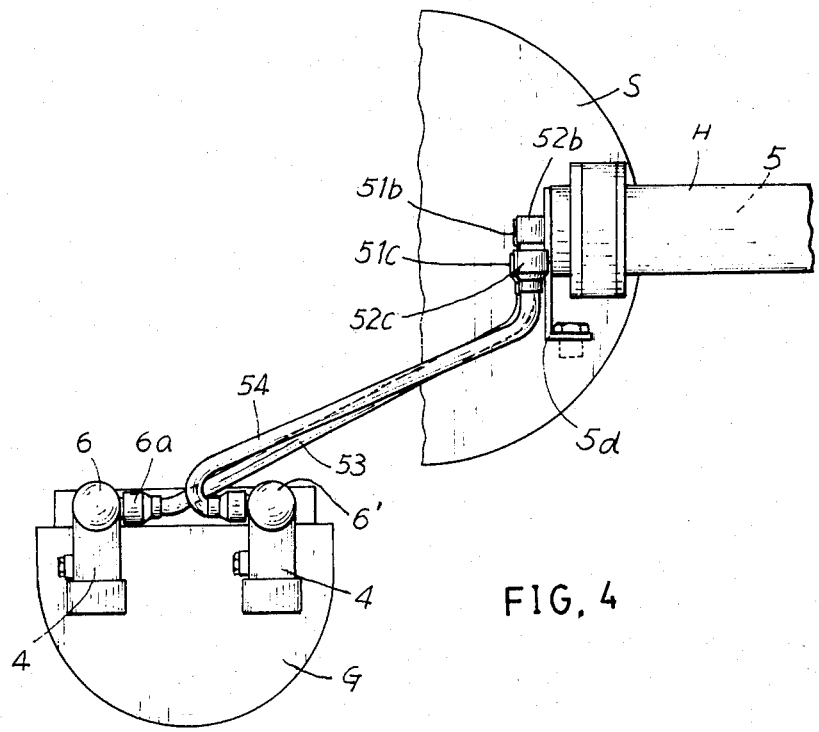
FIG. 4 is an illustration of the present invention taken from direction B of FIG. 3.

Another preferred embodiment of the present invention is shown in FIG. 3 and FIG. 4, which comprises a primary cylinder combination 5 and a secondary cylinder combination 6. Such an embodiment may be used in a scooter 150 cc. The primary cylinder combination 5 also comprises two primary cylinders 51, 52 as aforementioned, except that the diameter of each piston is equal. The description for the numerals of said primary cylinder combination as shown in FIG. 3 is thereby omitted.

Secondary cylinder combination 6 comprises two secondary cylinders 6, 6' each having the same diameter. Cylinder 6 includes a piston 61 and a piston rod 62 and the other cylinder 6' includes a piston 61' and a piston rod 62'. Two arc-link chains 63a, 63a' are respectively connected to two rods 62, 62'. Two chains 63a, 63'a respectively engage on both sides of pulley G3 of the gear shift G by two cylindrical engaging bars G1, G2.

When rotating the twist bar 5e, the tongue 5f will push the piston 51a the primary cylinder 51 to boost hydraulic fluid through first conduit 53 into secondary cylinder 6 to lower piston 61 and rotate the pulley G3 in the direction R1 for gear-shifting purpose. The chain 63'a and rod 62' on the right side of pulley G3 will be moved upwards to raise piston 61' to return the fluid in cylinder 6' through second conduit 54 into primary cylinder 52 to retract piston 52a therein for the next operation.

The present invention has the following advantages over any conventional art:

1. All cylinders are installed outside the brake, clutch or gear-shift so that any accidental oil leakage will not influence their operation. It will not obstruct the construction space of a vehicle. 2. The conventional wire ropes are eliminated so that the wire-broken defect and the friction caused by wire ropes will be inproved. The present invention will be operated in a smoother manner.

I claim:

1. An external driving system for a motorcycle gear shift comprising:
   a primary cylinder combination having two primary cylinders mounted on a handle of a motorcycle; and
   a secondary cylinder fluidically communicated with said primary cylinder combination by two delivery conduits, and including a piston in said secondary cylinder, a piston rod connected with a gear rack which engages with a driving gear of the motorcycle gear shift; the improvement which comprises:
   said primary cylinder combination including a first primary cylinder having a small diameter and fluidically communicated with an upper connector positioned above said piston of said secondary cylinder by a first delivery conduit of hydraulic fluid, a piston disposed in said primary cylinder, a second primary cylinder having a larger diameter than said first primary cylinder and fluidically communicated with a lower connector positioned under said piston of said secondary cylinder, a piston disposed in said second primary cylinder, the motorcycle handle having a hollow portion, both said primary cylinders inserted into the hollow portion of the motorcycle handle and both pistons of said primary cylinders alternatively pushed or retracted by an inclined-plane tongue of a twist bar formed in said handle, whereby upon the twisting of said twist bar, said piston in said first primary cylinder will be pushed to force the hydraulic fluid through said first delivery conduit to lower said piston in said secondary cylinder to actuate said gear shift and force the fluid under said piston of said secondary cylinder through said secondary delivery conduit for retracting said piston in said second primary cylinder.

2. An external driving system for motorcycle gear shift comprising:
   a primary cylinder combination having two primary cylinders mounted on a motorcycle handle, the handle having a hollow portion; and
   a secondary cylinder combination having two secondary cylinders respectively and fluidically communicated with two said primary cylinders, and operatively actuating the motorcycle gear shift;
   the improvement which comprises:
   said primary cylinder combination including two primary cylinders having the same diameter, a seaprate piston in each of said two primary cylinders alternatively pushed or retracted by an inclined-plane tongue of a twist bar formed in said handle, the two primary cylinders being inserted into the hollow portion of the motorcycle handle;
   said secondary cylinder combination including two secondary cylinders having the same diameter and each fluidically communicated with each said primary cylinder,
   each said secondary cylinder including a piston and a piston rod connected with an arc-link chain so that two arc-link chains of said two secondary cylinders respectively engage on both sides of a pulley of the gear shift, twisting of the twist bar in one direction causing the piston of one of said two primary cylinders to force hydraulic fluid to act on the piston of one of the secondary cylinders to thereby rotate the pulley to actuate said gear shift and have the piston of the other of the second cylinders force fluid to act on the piston of the other of said two primary cylinders for causing retraction of same.

* * * * *